April 3, 1934.　　　O. L. SNYDER　　　1,953,199

REDUCTION DRIVE FOR ENGINES

Filed Jan. 8, 1932

INVENTOR.
Oscar L. Snyder
BY
ATTORNEY.

Patented Apr. 3, 1934

1,953,199

UNITED STATES PATENT OFFICE 1,953,199

REDUCTION DRIVE FOR ENGINES

Oscar L. Snyder, Marysville, Mich., assignor, by mesne assignments, to Continental Aircraft Engine Company, Detroit, Mich., a corporation of Delaware Application January 8, 1932, Serial No. 585,552

5 Claims. (Cl. 74—7)

My invention relates to engines and more particularly to a propeller shaft supporting and driving means adapted for assembly with an aircraft engine, but it will be understood that the principles of my invention may be incorporated in engines other than the radial cylinder type herein illustrated and in engines other than those used for aircraft.

In order to better adapt an engine of the aforesaid type for use with different types of aircraft and for obtaining the maximum of benefit from the associated power plant, it is now customary to drive the propeller at a different speed than the engine and usually at a lesser speed, thereby permitting the use of a larger propeller and providing propeller blades of a relatively steeper pitch if so desired. This is usually accomplished by employing a speed reduction mechanism intermediate the engine crankshaft and propeller shaft and I find that cooperating gears of the type shown in the illustrated embodiment of my invention which comprises an internal gear carried by the propeller shaft and an external gear carried by the crankshaft are very satisfactory.

One difficulty with the reduction gearing herein illustrated has been the trouble encountered in accurately positioning the driving and driven elements in assembling the engine and also in taking up clearance between said elements when the same become worn.

An object of my invention is to construct an improved propeller shaft drive of the type including driving and driven elements respectively carried by the engine crankshaft and propeller shaft by incorporating therewith means for relatively adjusting the position of the crankshaft and propeller shaft whereby to effect a predetermined relative adjustment of said driving and driven elements.

A further object of my invention is to construct an improved propeller shaft drive of the aforesaid type by providing means for relatively shifting the propeller shaft supporting means with respect to the crankshaft axis whereby to relatively position the said driving and driven elements.

Figure 1:
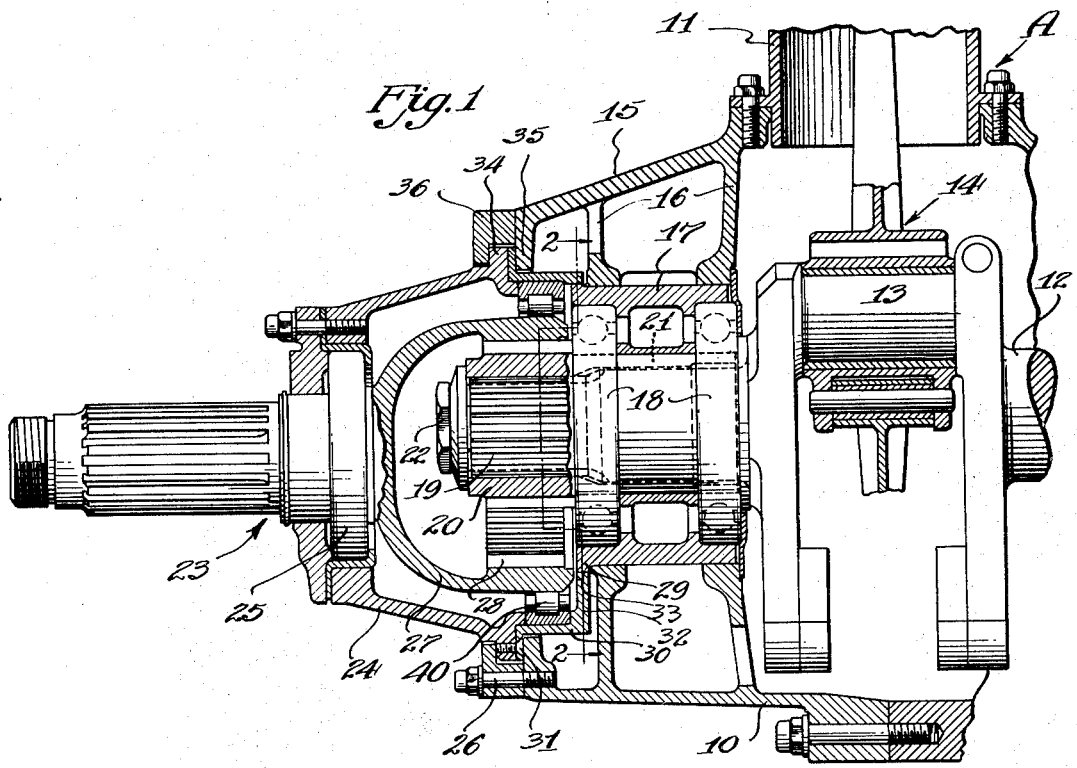
Figure 2:
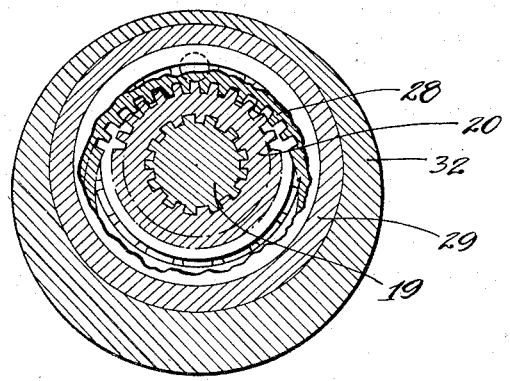

For a more detailed understanding of my invention, reference may be had to the accompanying drawing which illustrates one form which my invention may assume, and in which:

Fig. 1 is a longitudinal sectional view through a portion of an internal combustion engine and illustrating my improved propeller shaft drive, and Fig. 2 is a transverse sectional view taken on the line 2—2 of Fig. 1.

For purposes of illustration I have chosen to illustrate my invention as incorporated with an engine of the radial cylinder type, though obviously the principles of said invention may be incorporated in engines other than those of the radial type. In the illustrated embodiment of my invention I have provided an engine structure A which includes a crankcase 10 to which a plurality of cylinders 11 may be secured. A crankshaft 12 is arranged to be supported preferably by the crankcase in suitable bearings and is provided with a crank portion 13 arranged for connection with a suitable articulated rod structure 14.

The forward portion of the crankcase is preferably provided with the extended portion 15 carrying suitable inwardly extending partitions 16 adapted for supporting a bearing sleeve 17 which is so constructed as to support the spaced bearing structures 18 for supporting the forward end of the crankshaft. The forward end of the crankshaft is preferably extended beyond the forward face of the crankcase and the end thereof is preferably splined at 19 to which a driving gear 20 may be secured. Preferably the driving gear 20 is provided with a rearwardly extending hub portion 21 arranged to extend within the bearing structures 18 in order to support the driving gear by the crankcase. A nut or other suitable locking means 22 may be utilized to lock the driving gear 20 to the crankshaft.

A propeller shaft 23 is provided and is preferably supported in a propeller shaft supporting means or housing 24, said housing carrying a bearing structure 25 for rotatively supporting said propeller shaft. The housing 24 is sometimes referred to as the nose and is adapted to be secured to the crankcase by bolts or other suitable fastening devices 26. The inner or rear end portion of the propeller shaft is preferably enlarged as at 27 and carries the internal gear 28 which is arranged for engagement with the driving gear 20. Preferably the driving and driven elements or gears 20 and 28 respectively are constructed for direct engagement. Preferably the axis of the propeller shaft is parallel with and offset with respect to the crank shaft axis substantially in the manner as shown in the drawing.

With this type of propeller shaft drive it is quite essential that the driving and driven elements respectively associated with the crankshaft and propeller shaft be accurately positioned as to avoid the tendency of the same to bind in operation. Furthermore, there is a tendency of these gears to wear and from time to time it is found desirable and advisable to take up the clearance between the engaging driving and driven elements of the propeller shaft drive mechanism.

In my present invention I have provided a simple arrangement by which the propeller shaft and crankshaft axes can be relatively shifted to properly position the driving and driven elements of the propeller shaft drive mechanism. In the illustrated embodiment of my invention the bearing sleeve 17 is extended beyond the forward partition 16 and is preferably enlarged in diameter and provided with a pilot 29 having an outer peripheral bearing surface substantially circular and eccentrically arranged with respect to the axis of the crankshaft and the sleeve 17, said sleeve being preferably axially aligned and concentric with the crankshaft. I have found that an eccentricity of approximately .008" is sufficient to provide the adjustment necessary in positioning the driving and driven elements of the propeller shaft drive mechanism. A flange member 30 is secured to the propeller shaft supporting means or housing 24 by a plurality of screws or other suitable fastening devices 31. This member 30 preferably extends rearwardly of the housing and is provided with a radially inward extending flange portion 32 having a circular bore or opening 33 arranged for cooperative engagement with the pilot 29. This opening 33 is arranged eccentrically with respect to the propeller shaft axis and in the construction illustrated the eccentricity of said opening 33 with respect to the axis of the propeller shaft is approximately 0.6". Obviously the particular degree of eccentricity may be varied depending upon the type and size of gears employed as determined by the amount of speed reduction desired.

In order to relatively adjust the driving and driven gears of the propeller shaft drive mechanism, it is necessary to relatively rotate the propeller shaft housing with respect to the crankcase about the eccentric pilot 29. The housing 24 is provided with the outwardly extending flange 34 adapted for engagement with the inwardly extending flange 35 carried by the forwardly extending crankcase portion 15. In order to secure the housing 24 to the crankcase a ring 36 is provided for clamping the housing thereto, the fastening devices or bolts 26 being adapted to firmly clamp the housing to the crankcase. When necessary to adjust the position of the driving and driven elements or gears 20 and 28 respectively, the bolts 26 are first loosened to release the housing structure from clamping engagement with the crankcase, thereby permitting the angular shifting of the housing about the eccentric pilot 29. On turning this housing about the eccentric pilot it will be noted that the axis of the propeller shaft is laterally shifted toward or away from the axis of the crankshaft thus relatively shifting the driving and driven element or gears 20 and 28 respectively toward or away from each other. This adjustment is quite essential in assembling the engine so as to obtain the correct relative clearance between the driving and driven elements so as to eliminate any tendency of said elements to bind. As wear takes place, the excessive clearance may be taken up from time to time in the manner as described above.

Preferably the member 30 is so constructed as to support an anti-friction bearing 40 for supporting the rearward end portion of the propeller shaft, this bearing structure preferably supporting the enlarged portion of the propeller shaft which carries the internal gear 28.

It will be noted that the arrangement described above provides a simple engine assembly and in addition provides a structure in which relative adjustment of the elements comprising the propeller shaft drive mechanism are facilitated.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In an engine of the character described having in combination, a crankcase, a crankshaft supported thereby, a propeller shaft, means for supporting said propeller shaft, said crankcase carrying a portion eccentric to the crankshaft, said means including a bearing surface eccentrically arranged with respect to the propeller shaft axis and engaging the said crankcase eccentric portion, said means being angularly shiftable about the crankcase eccentric whereby to relatively shift the propeller shaft and crankshaft axes.

2. In an engine of the character described having in combination, a crankcase, a crankshaft supported thereby, a propeller shaft, means for supporting the propeller shaft, a pilot carried by said crankcase and constructed eccentric with respect to the crankshaft axis, said propeller shaft supporting means having a pilot receiving portion eccentric with respect to said propeller shaft and adapted to be adjustably positioned with respect to said eccentric pilot whereby to provide a predetermined adjustment of the propeller shaft with respect to the crankshaft, and means for securing the propeller shaft supporting means to said crankcase.

3. In an engine of the character described having in combination, a crankshaft, a propeller shaft, means for supporting the propeller shaft, driving connections intermediate the crankshaft and propeller shaft, and means including an eccentric portion associated with said crankshaft for positioning said propeller shaft supporting means, said propeller shaft supporting means provided with an aperture eccentrically arranged relative to the propeller shaft and engaging said eccentric portion, said propeller shaft supporting means being angularly shiftable about said eccentric portion whereby to adjustably position the propeller shaft relative to the crankshaft.

4. In an engine of the character described having in combination, a crankcase, a crankshaft supported thereby, a propeller shaft, means for supporting the propeller shaft, driving and driven elements respectively carried by said crankshaft and propeller shaft and adapted for operatively connecting said shafts together in driving relation, a bearing retainer carried by said crankcase concentrically with the crankshaft axis and supporting one or more anti-friction bearings for supporting said crankshaft, said retainer having an eccentric portion, said propeller shaft supporting means supported by said eccentric portion and angularly shiftable relative thereto whereby to relatively position said driving and driven elements, and means for securing said propeller shaft supporting means to said crankcase.

5. In an engine of the character described having in combination, a crankcase, a crankshaft, a propeller shaft, means for supporting the propeller shaft, driving and driven elements concentrically carried by said crankshaft and propeller shaft respectively, and cooperating interengaging annular members respectively carried by and positioned eccentrically with said crankcase and said propeller shaft supporting means, one of said members being fixed relative to the engine crankcase, said annular members being relatively shiftable whereby to selectively position the propeller shaft relative to the crankshaft.

OSCAR L. SNYDER.